United States Patent [19]  
Uenishi et al.

[11] Patent Number: 4,904,706  
[45] Date of Patent: Feb. 27, 1990

[54] SOFT POLYURETHANE FOAM FROM HYDROXYL URETHANE PREPOLYMER AND POLYESTER ETHER POLYOL

[75] Inventors: Kazuya Uenishi, Takaishi; Yasuji Tsunekawa, Kumatori, both of Japan

[73] Assignee: Dainippon Ink and Chemicals, Inc., Tokyo, Japan

[21] Appl. No.: 220,980

[22] Filed: Jul. 19, 1988

Related U.S. Application Data

[63] Continuation of Ser. No. 841,836, Mar. 20, 1986, abandoned.

[51] Int. Cl.$^4$ .............................................. C09D 13/00
[52] U.S. Cl. ....................................... 521/164; 521/904
[58] Field of Search ................. 521/164, 904, 172, 174

[56] References Cited

U.S. PATENT DOCUMENTS

| | | | |
|---|---|---|---|
| 3,078,239 | 2/1963 | Gmitter | 260/2.5 |
| 3,997,514 | 12/1976 | Kogon | 260/77.5 |
| 4,100,354 | 7/1978 | Owen Jr. | 521/172 |
| 4,302,272 | 11/1981 | Phillips et al. | 156/309.9 |
| 4,307,205 | 12/1981 | Bershas | 521/172 |
| 4,546,122 | 10/1985 | Radovich et al. | 521/164 |

FOREIGN PATENT DOCUMENTS

| | | | |
|---|---|---|---|
| 569774 | 1/1959 | United Kingdom | 521/172 |
| 893075 | 5/1962 | United Kingdom | 521/172 |
| 983850 | 2/1965 | United Kingdom | 521/172 |

*Primary Examiner*—John Kight
*Assistant Examiner*—Dennis R. Daley
*Attorney, Agent, or Firm*—Sherman and Shalloway

[57] ABSTRACT

A soft polyurethane foam produced from a polyhydroxy compound, a polyisocyanate, a catalyst, a foam stabilizer, water and/or a blowing agent, the improvement wherein the polyhydroxy compound is

[1] a terminal hydroxyl group-containing urethane prepolymer obtained by the reaction of at least one polyol selected from the group consisting of the following (A) to (H) with a polyisocyanate and/or

[2] at least one polyo selected from the group consisting of the following (D), (E) and (F):

(A) a low-molecular-weight polyhydroxy compound,
(B) a polyoxyalkylene polyol,
(C) an aromatic ring-containing diol,
(D) a polyester ether polyol and optionally a low-molecular-weight polyhydroxy compound and at least one compound selected from aliphatic dicarboxylic acids, aromatic dicarboxylic acids, and anhydrides and derivatives thereof,
(E) a polyester ether polyol and optionally a low-molecular-weight polyhydroxy compound and at least one compound selected from aliphatic dicarboxylic acids, aromatic dicarboxylic acids, and anhydrides and derivatives thereof,
(F) a polyester ether polyol and optionally a low-molecular-weight polyhydroxy compound and a mixture of aromatic dicarboxylic acids or their anhydrides or derivatives,
(G) polyoxytetramethylene glycol and
(H) an acid-alcohol-condensation-type polyester polyol.

13 Claims, No Drawings

SOFT POLYURETHANE FOAM FROM HYDROXYL URETHANE PREPOLYMER AND POLYESTER ETHER POLYOL

This application is a continuation, of application Ser. No. 841,836 filed March 20, 1986, now abandoned.

This invention relates to a novel, useful, heat-fusible, soft polyurethane foam excellent in stability of a stock solution as well as mechanical properties and scorch resistance of the foam. More specifically, this invention relates to the above soft polyurethane foam produced by using a specific terminal hydroxyl group-containing urethane prepolymer and/or a specific polyester ether polyol.

Varied attempts have been hitherto made to impart a heat fusibility of soft urethane foams. Known examples thereof are a method using phosphorus-containing polyether polyols (Japanese Patent Publication No. 37600/73), a method wherein before flame lamination phosphoric acid is adhered to at least one of an urethane foam and a substrate (Japanese Patent Publication No. 6519/72) and a method using an urethane foam comprising a polyester ether polyol composed of a polyoxyalkylene polyol, a polycarboxylic acid anhydride and a cyclic ether compound, and an organic phosphorus compound (Japanese Patent Publication No. 30309/71). However, these methods are incomplete suffering from the following drawbacks. (i) A stability of a stock solution is poor. (ii) Mechanical properties of a foam are poor. (iii) A heat fusibility is not enough, and some fused products have no adhesive strength at all. (iv) A degree of scorching is high at the time of producing the foam.

In order to eliminate the foregoing drawbacks in the prior art, the present inventors have made extensive studies and have completed this invention.

Namely, this invention provides a soft polyurethane foam produced from a polyhydroxy compound, a polyisocyanate, a catalyst, a foam stabilizer, water and/or a blowing agent, characterized in that the polyhydroxy compound is (1) a terminal hydroxyl group-containing urethane prepolymer obtained by the reaction of at least one polyol selected from the group consisting of the following (A) to (H) with a polyisocyanate, and/or
(2) at least one polyol selected from the group consisting of the following (D), (E) and (F):
(A) a low-molecular-weight polyhydroxy compound,
(B) a polyoxyalkylene polyol having a molecular weight of 300 to 5,000,
(C) an aromatic ring-containing diol obtained by adding an alkylene oxide to an aromatic dihydroxy compound having a molecular weight of 230 to 5,000,
(D) a polyester ether polyol having a molecular weight of 500 to 6,000 and comprising a polyoxyalkylene glycol having a molecular weight of 300 to 5,000 and optionally a low-molecular-weight polyhydroxy compound as an alcohol component and at least one compound selected from aliphatic dicarboxylic acids, aromatic dicarboxylic acids, and anhydrides and derivatives thereof as an acid component,
(E) a polyester ether polyol having a molecular weight of 500 to 6,000 and comprising an aromatic ring-containing diol having a molecular weight of 230 to 5,000 and obtained by adding an alkylene oxide to an aromatic dihydroxy compound and optionally a low-molecular-weight polyhydroxy compound as an alcohol component and at least one compound selected from aliphatic dicarboxylic acids having 3 to 6 carbon atoms, aromatic dicarboxylic acids, and anhydrides and derivatives thereof,
(F) a polyester ether polyol having a molecular weight of 500 to 6,000 and comprising an aromatic ring-containing diol having a molecular weight of 230 to 5,000 and obtained by adding an alkylene oxide to an aromatic dihydroxy compound and optionally a low-molecular-weight polyhydroxy compound as an alcohol component and a mixture of aromatic dicarboxylic acids and long-chain aliphatic dicarboxylic acids having 7 to 14 carbon atoms, or their anhydrides or derivatives as an acid component,
(G) polyoxytetramethylene glycol having a molecular weight of 500 to 5,000, and
(H) an acid-alcohol-condensation-type polyester polyol obtained from a low-molecular-weight polyhydroxy compound and at least one compound selected from aliphatic dicarboxylic acids, aromatic dicarboxylic acids and anhydrides and derivatives thereof, and/or a polylactone-type polyester polyol formed by polymerizing ε-caprolactone.

As the component (A) or the low-molecular-weight polyhydroxy compound, compounds containing 2 to 4 functional groups and having a molecular weight of 60 to 300 are preferable. Examples thereof are glycols such as ethylene glycol, 1,2-propylene glycol, 1,3-propylene glycol, diethylene glycol, 1,3-butylene glycol, 1,4-butylene glycol, 1,6-hexamethylene glycol, bishydroxyethoxybenzene (or p-xylene) glycol and neopentyl glycol; and polyfunctional polyhydroxy compounds such as glycerol, trimethylolpropane, hexanetriol, triethanolamine, pentaerythritol and ethylenediamine.

Examples of the component (B) or the polyoxyalkylene polyol are compounds having a molecular weight of 300 to 5,000 and obtained by adding alkylene oxides (e.g. ethylene oxide, propylene oxide, butylene oxide, styrene oxide and epichlorohydrin) to low-molecular-weight polyhydroxy compounds having 2 to 4 functional groups (e.g. the compounds used as the component (A)).

The component (C) or the alkylene oxide addition product of the aromatic dihydroxy compound refers to an aromatic ring-containing polyether diol having a molecular weight of 230 to 5,000, preferably 250 to 2,000. Examples of the aromatic dihydroxy compound are catechol, hydroquinone, bishydroxyethoxybenzene, compounds of formula

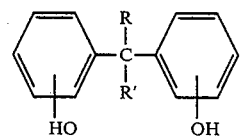

wherein R and R' each denote a hydrogen atom or an alkyl group, and compounds of formula:

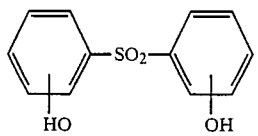

Considering the case of obtaining starting materials and the properties as soft polyurethane foams, bisphenols A, F and S are most preferable. Meanwhile, examples of the alkylene oxide used for addition to the aromatic dihydroxy compound are ethylene oxide, propylene oxide, epichlorohydrin, 1,2-butylene oxide and a mixture of these.

The polyoxyalkylene glycol having the molecular weight of 300 to 5,000 and optionally the low-molecular-weight polyhydroxy compound, employed as an alcohol component to prepare the polyester ether polyol (component D), can be the same as the above components (B) and (A) respectively. On the other hand, examples of the aliphatic dicarboxylic acid used as the acid component are preferably compounds having 3 to 14 carbon atoms, such as malic acid, succinic acid, glutaric acid, adipic acid, pimelic acid, suberic acid, azelaic acid, sebacic acid, 1,9-nonamethylenedicarboxylic acid, 1,10-decamethylenedicarboxylic acid, 1,11-undecamethylenedicarboxylic acid and 1,12-dodecamethylenedicarboxylic acid. Examples of the aromatic dicarboxylic acid used as the acid component are o-phthalic acid, isophthalic acid, terephthalic acid, naphthalenedicarboxylic acid, anthracenedicarboxylic acid and phenanthrenedicarboxylic acid. Naturally, anhydrides and derivatives thereof (e.g. $C_1$–$C_4$ alcohol ester compounds such as dimethyl terphthalate and monomethyl phthalate) are also available. They may be used as a mixture of two or more compounds. Most preferable are o-phthalic acid, isophthalic acid and terephthalic acid.

The aromatic ring-containing diol having the molecular weight of 230 to 5,000 and obtained by adding the alkylene oxide to the aromatic dihydroxy compound, said diol being used to prepare the polyester ether polyol (component E), can be the same as the component (C). The low-molecular-weight polyhydroxy compound optionally used can be the same as the component (A). Examples of the aliphatic dicarboxylic acid are compounds having 3 to 6 carbon atoms, such as malic acid, succinic acid, glutaric acid and adipic acid. The aromatic dicarboxylic acid can be the same as used in the component (D).

The aromatic ring-containing diol having the molecular weight of 500 to 6,000, which is used to prepare the polyester ether polyol (component F), can be the same as the component (C). The low-molecular-weight polyhydroxy compound can be the same as the component (A). Suitable examples of the long-chain aliphatic dicarboxylic acid are compounds having 7 to 14 carbon atoms and can be dicarboxylic acids from pimelic acid to 1,12-dodecamethylenedicarboxylic acid among those taken as the starting material of the component (D). Preferable are azelaic acid having 9 carbon atoms and sebacic acid having 10 carbon atoms. In case of using aliphatic dicarboxylic acids having 6 or less carbon atoms, an elongation of soft polyurethane foams comes to decrease. In case of using aliphatic dicarboxylic acids having 15 or more carbon atoms, a hardness and a strength of foams come to decrease. Both cases are thus unwanted. The aromatic dicarboxylic acid can be the same as used to prepare the component (D). The aromatic dicarboxylic acid and the long-chain aliphatic dicarboxylic acid are used at a molar ratio of 1/9 to 9/1. From the aspect of mechanical properties of the resulting foams, the ratio of 5/5 to 9/1 is preferable.

As to the component (G) or polyoxytetramethylene glycol having the molecular weight of 500 to 5,000, an explanation is unnecessary.

The acid-alcohol-condensation-type polyester polyol as the component (H) is obtained from the same low-molecular-weight polyhydroxy compound as the component (A) and at least one compound selected from the same aliphatic dicarboxylic acids, aromatic dicarboxylic acids, and anhydrides and derivatives thereof (e.g. ($C_1$–$C_4$ alcohol ester compounds) as those used to prepare the component (D). The lactone-type polyester polyol can be afforded by polymerizing ε-caprolactone.

For preparing the polyester ether polyol or the polyester polyol using the aforesaid starting materials, hitherto known techniques of esterification in vacuo and/or using a catalyst are employable. Typical methods thereof are a method wherein glycols are reacted with dicarboxylic acids under normal pressures, a method wherein esterification is performed in vacuo and a method wherein esterification is conducted in the presence of an inert solvent such as toluene and a condensation water and the solvent are subjected to azeotropy to remove them outside the reaction system.

The reaction can be naturally effected in the absence of the solvent. However, it is generally advisable to conduct the reaction using ordinary catalysts, for the esterification reaction to smoothly proceed, such as organic or inorganic acids; chlorides, oxides and hydroxides of metals such as Li, Na, K, Rb, Ca, Mg, Sr, Zn, Al, Ti, V, Cr, Mn, Fe, Co, Ni, Cu, Zr, Pd, Sn, Sb and Pb; salts of said metals and aliphatic acids such as acetic acid, oxalic acid, octylic acid, lauric acid and naphthenic acid; alcolates such as sodium methylate, sodium ethylate, aluminum triisopropoxide, isopropyl titanate and n-butyl titanate; phenolates such as sodium phenolate; and organometallic compounds of metals such as Al, Ti, Zn, Sn, Zr and Pb. The suitable amount of the catalyst is 0.00001 to about 5% by weight, preferably 0.001 to 2% by weight based on the total amount of starting materials for preparing the polyester diol. On this occassion, the reaction temperature is usually 100° to 250° C.

The terminal hydroxyl group-containing urethane prepolymer in this invention can be prepared by a common method of producing urethane prepolymers using the aforesaid starting materials. Namely, it can be formed by a general method or a successive method under such conditions that the temperature is 50° to 100° C., an atmosphere is nitrogen and an OH/NCO molar ratio is 1–5/1, preferably 1.2–1.5/1.

Examples of the polyisocyanate used in this invention are 2,4-tolylene diisocyanate, 2,6-tolylene diisocyanate and a mixture of these, m-phenylene diisocyanate, p-phenylene diisocyanate, p-xylene diisocyanate, ethylene diisocyanate, tetramethylene-1,4-diisocyanate, hexamethylene-1,6-diisocyanate, diphenylmethane- 4,4'-diisocyanate, 3,3'-dimethyldiphenylmethane-4,4'-diisocyanate, 3,3'-dimethyl-4,4'-biphenylene diisocyanate, 3,3'-dichloro-4,4'-biphenylene diisocyanate, 4,4'-biphenylene diisocyanate, 1,5-naphthalene diisocyanate, coarse diphenylmethane diisocyanate, and derivatives of diphenylmethane diisocyanate.

In this invention, when the terminal hydroxyl group-containing urethane prepolymer (1) is prepared by reacting at least one polyol selected from said (A) to (H) with the polyisocyanate, it is preferable to combine two or more of (A) to (H). A combination of (A) with at least one of (B) to (H) is especially preferable. Combinations of (A) and (F), (A) and (E), (A) and (D) and (A) and (B) are preferable from the aspects of effects of foam strength and heat fusibility. The soft urethane foam using such terminal hydroxyl group-containing urethane prepolymer, when flamed, causes recombination by a chemical bond which is effective for enhancing an adhesive strength with a substrate (heat fusibility). Among the polyols (B) to (H), those containing the aromatic ring or having the ester linkage are preferable because they increase the strength and the heat fusibility of the foam. The hydroxyl value of the terminal hydroxyl group-containing urethane prepolymer is 5 to 150, more preferably 30 to 100.

In this invention, when using at least one polyester ether polyol (2) selected from the group consisting of (D), (E) and (F), it is advisable to employ same in the preference order of (F), (E) and (D). In the polyester ether polyols (D), (E) and (F), the amount of the aromatic ring is preferably 5 to 50% by weight, most preferably 7 to 40% by weight. The hydroxyl value of the polyester ether polyol is preferably 15 to 250.

In this invention, when the terminal hydroxyl group-containing urethane prepolymer (1) is used in combination with the polyester polyol (2) selected from (D), (E) and (F), it is advisable to employ an aromatic ring-containing polyol in one of these components. Introduction of the aromatic ring helps increase the strength of the foam and the heat fusibility. On this occassion, however, a viscosity of the stock solution sometimes increases; it is therefore advisable to introduce the aromatic ring into one component and keep the viscosity within a practical range.

The combination of the terminal hydroxyl group-containing urethane prepolymer (1) and the polyester ether polyol (2) contributes to developing a synergistic effect as a heat-fusible soft polyurethane foam. That is, the terminal hydroxyl group-containing urethane prepolymer (1), when flamed, induces recombination by a chemical bond to enhance an adhesive strength with the substrate. The polyester ether polyol (2), owing to the ester linkage, increases a cohesive force, elevates a decomposition temperature of the foam, provides a fused state at the time of heating, enters into the substrate and cures to raise the adhesive strength.

The terminal hydroxyl group-containing urethane prepolymer (1) and the polyester ether polyol [2] produce, as described above, the heat-fusible soft polyurethane foam quite excellent in stability of the stock solution as well as mechanical properties, heat fusibility and scorch resistance of the foam. In practising this invention, the above-described specific materials have to be substantially used, but the conjoint use of other polyols is also possible if required. Examples of the other polyols are those containing 2 to 8 functional groups and having a molecular weight of 500 to 7,000, for example, polyether polyols such as polyoxypropylene polyol, polyoxyethylene polyol, polyoxyethylenepropylene polyol (block or random polymer) and polyoxytetramethylene glycol; adipic acid-type polyester polyols such as polyethylene adipate and polybutylene adipate; lactone-type polyester polyols; and polyols obtained by introducing into these polyols polyfunctional components such as trimethylolpropane, pentaerythritol and hexanetriol. A weight ratio of the specific polyols (1) and/or (2) to these other polyols is preferably 80-10:-20-90.

The soft polyurethane foam of this invention can be produced from the foregoing starting materials by a conventional process such as a one-shot process or a prepolymer process. The prepolymer process comprises previously reacting a polyhydroxy compound with a polyisocyanate to form a prepolymer, and then reacting the prepolymer with a polyhydroxy compound in the presence of a blowing agent, a catalyst, a foam stabilizer and other additives. The one-shot process comprises reacting an organic polyisocyanate with a polyhydroxy compound in the presence of a catalyst, a blowing agent, a foam stabilizer and other additives. Examples of the polyisocyanate can be the aforesaid polyisocyanates. At this time, the NCO/OH equivalent ratio is preferably 1 to 1.2. Examples of the catalyst can be those commonly used to produce polyurethane foams, such as organotin compound catalysts and amine-type catalysts. Examples of the organotin compound catalysts are stannous octoate, stannous oleate, dibutyltin dilaurate, dibutyltin di-2-ethylhexoate and dibutyltin diacetate. Examples of the amine-type catalysts are triethylamine, triethanolamine, diethanolamine, monoethanolamine, triethylenediamine and tetramethylpropylenediamine.

Examples of the foam stabilizer can be silicone-type foam stabilizers commonly used to produce polyurethane foams. The amount of the foam stabilizer is 0.5 to 5 parts by weight per 100 parts by weight of the polyol.

In this invention, water (generating a carbon dioxide gas by the reaction with an organic isocyanate) is mainly used as a blowing agent. Low-boiling organic compounds such as monofluorotrichloromethane and ethylene chloride or air is also available if required. Preferably, the amount of water is 10 parts by weight or less per 100 parts by weight of the polyol, and the amount of the organic compound is 0 to 30 parts by weight per 100 parts by weight of the polyol.

In addition to the aforesaid compounding ingredients, fillers, antistatic agents, coloring agents and fire retardants may be added according to the performance required for foams unless deviating from the object of this invention.

The following Examples illustrate this invention in more detail. However, this invention is not limited to these Examples. Parts and percentages in Examples are all on the weight basis.

EXAMPLE 1:

134 parts of trimethylolpropane, 3,000 parts of polyoxypropylene diol having a molecular weight of 1,000 and 522 parts of a mixture of 2,4- and 2,6-tolylene diisocyanates (2,4/2,6 ratio 80/20; hereinafter called "TDI-80") were reacted at 80° C. under an atmosphere of nitrogen to form a terminal hydroxyl group-containing urethane prepolymer (hydroxyl value 46.5).

A polyester ether polyol (hydroxyl value 53.0) was prepared from 2,800 parts of polyoxypropylene diol having a molecular weight of 400, 1,280 parts of adipic acid and 390 parts of diethylene glycol.

20 parts of the terminal hydroxyl group-containing urethane prepolymer, 20 parts of the polyester ether polyol and 60 parts of polyoxypropylene triol having a molecular weight of 3,000 were mixed. To the mixture were added a solution of 0.1 part of triethylenediamine in 4.0 parts of water, 1.0 part of Silicone L-540 (tradename for a product made by Nippon Unitika K. K.) and 0.20 part of stannous octoate. 49.3 parts of TDI-80 (NCO index 105) was further added, and the mixture was vigorously stirred and then poured into a suitable die. There resulted a soft polyurethane foam (I).

EXAMPLE 2:

2,000 parts of polyoxypropylene diol having a molecular weight of 2,000 was reacted with 348 parts of TDI-80 under an atmosphere of nitrogen to obtain an urethane polymer containing NCO groups at both terminals. Subsequently, the polymer was reacted with 212 parts of diethylene glycol under the same conditions to form a terminal hydroxyl group-containing urethane prepolymer (hydroxyl value 43.8).

A polyester ether polyol having a molecular weight of 2,000 was prepared from an aromatic ring-containing diol having a molecular weight of 600 and obtained by adding propylene oxide to bisphenol A, and adipic acid.

20 parts of the terminal hydroxyl group-containing urethane prepolymer, 20 parts of the polyester ether polyol and 60 parts of polyoxypropylene triol having a molecular weight of 3,000 were mixed and the mixture was foamed as in Example 1 to obtain a soft polyurethane foam (II).

EXAMPLE 3:

A polyester polyol (hydroxyl value 53.0) was obtained from 2,800 parts of polyoxypropylene diol having a molecular weight of 400, 1,280 parts of adipic acid and 390 parts of diethylene glycol. 2,120 parts of the resulting polyester polyol was reacted with 348 parts of TDI-80 to form a terminal NCO group-containing prepolymer. The prepolymer was then reacted with 208 parts of neopentyl glycol to afford a terminal hydroxyl group-containing urethane prepolymer (hydroxyl value 42.0).

A polyester ether polyol having a molecular weight of 2,000 was prepared from an aromatic ring-containing diol having a molecular weight of 600 and obtained by adding propylene oxide to bisphenol A, and isophthalic acid.

15 parts of the terminal hydroxyl group-containing urethane prepolymer, 15 parts of the polyester ether polyol and 70 parts of polyoxypropylene triol having a molecular weight of 3,000 were mixed, and the mixture was foamed as in Example 1. There was obtained a soft polyurethane foam (III).

EXAMPLE 4:

1,000 parts of an aromatic ring-containing diol having a molecular weight of 1,000 and obtained by adding propylene oxide to bisphenol A was reacted with 348 parts of TDI-80 to form a terminal NCO group-containing urethane prepolymer which was then reacted with 124 parts of ethylene glycol. There resulted a terminal hydroxyl group-containing urethane prepolymer (hydroxyl value 76.0).

A polyester ether polyol having a molecular weight of 3,000 was prepared from 482 parts of polyoxypropylene diol having a molecular weight of 600, 25 parts by ethylene glycol and 146 parts of adipic acid.

18 parts of the terminal hydroxyl group-containing urethane prepolymer, 20 parts of the polyester ether polyol and 62 parts of polyoxypropylene triol having a molecular weight of 3,000 were mixed and the mixture was foamed as in Example 1 to afford a soft polyurethane foam (IV).

EXAMPLE 5:

2,000 parts of a polyester ether polyol having a molecular weight of 2,000 and obtained from an aromatic ring-containing diol having a molecular weight of 600 and resulting from adding propylene oxide to bisphenol A, and adipic acid was reacted with 348 parts of TDI-80 to afford a terminal NCO group-containing urethane prepolymer. Subsequently, the prepolymer was reacted with 124 parts of ethylene glycol to afford a terminal hydroxyl group-containing urethane prepolymer (hydroxyl value 45.5).

A polyester ether polyol having a molecular weight of 2,000 was prepared from 381 parts of polyoxypropylene diol having a molecular weight of 400, 20 parts of ethylene glycol and 166 parts of isophthalic acid.

10 parts of the terminal hydroxyl group-containing urethane prepolymer, 20 parts of the polyester ether polyol and 70 parts of polyoxypropyl tetrol were mixed, and the mixture was foamed as in Example 1 to obtain a soft polyurethane foam (V).

EXAMPLE 6:

A polyester ether polyol containing about 3% of trimethylolpropane in a molecule and having a hydroxyl value of 61.0 and an acid value of 0.17 was formed from an aromatic ring-containing polyether having a molecular weight of 600 and obtained by adding polyoxylene oxide to bisphenol A, trimethylolpropane and sebacic acid/isophthalic acid (molar ratio 3/7) mixture. 920 parts of the polyester ether polyol was reacted with 174 parts of TDI-80 to obtain a terminal NCO group-containing urethane prepolymer which was then reacted with 106 parts of diethylene glycol. There was obtained a terminal hydroxyl group-containing urethane prepolymer.

A polyester ether polyol having a molecular weight of 2,000 was prepared from 380 parts of polyoxypropylene diol having a molecular weight of 400, 28 parts of 1,4-butylene glycol, 83 parts of isophthalic acid and 73 parts of adipic acid.

15 parts of the terminal hydroxyl group-containing prepolymer, 15 parts of the polyester ether polyol and 70 parts of polyoxypropylene triol having a molecular weight of 3,000 were mixed, and the mixture was foamed as in Example 1 to afford a soft urethane foam [VI].

EXAMPLE 7:

2,000 parts of polyoxytetramethylene glycol having a molecular weight of 2,000 was reacted with 348 parts of TDI-80 to obtain a terminal NCO group-containing urethane prepolymer which was then reacted with 180 parts of 1,4-butanediol to afford a terminal hydroxyl group-containing urethane prepolymer.

A polyester ether polyol having a molecular weight of 2,500 was prepared from an aromatic group-containing polyether polyol having a molecular weight of 800 and obtained by adding propylene oxide to bisphenol A, and an azelaic acid/isophthalic acid (molar ratio 4/6) mixture.

40 parts of the terminal hydroxyl group-containing prepolymer, 15 parts of the polyester ether polyol and 45 parts of polyoxypropylene triol having a molecular weight of 3,000 were mixed, and the mixture was foamed as in Example 1 to obtain a soft polyurethane foam (VII).

EXAMPLE 8:

2,000 parts of polyethylene butylene adipate having a molecular weight of 2,000 was reacted with 348 parts of TDI-80 to obtain a terminal NCO group-containing urethane prepolymer which was then reacted with 212 parts of diethylene glycol. There resulted a terminal hydroxyl group-containing urethane prepolymer.

A polyester ether polyol having a molecular weight of 2,000 was prepared from 542 parts of an aromatic ring-containing polyether having a molecular weight of 600 and obtained by adding propylene oxide to bisphenol S, 48 parts of diethylene glycol, 83 parts of isophthalic acid and 73 parts of adipic acid.

10 parts of the terminal hydroxyl group-containing urethane prepolymer, 15 parts of the polyester ether polyol and 75 parts of polyoxypropylene triol having a molecular weight of 3,000 were mixed, and the mixture was foamed as in Example 1 to provide a soft polyurethane foam (VIII).

COMPARATIVE EXAMPLE 1:

A soft polyurethane foam (I') was prepared in the same way as in Example 1 except using as a polyol a mixture comprising 97 g of polyoxypropylene triol having an average molecular weight of 3,000 and obtained by adding propylene oxide to glycerol and 3 g of propoxylated phosphoric acid having a hydroxyl value of 330 and obtained by adding propylene oxide to 100% phosphoric acid.

COMPARATIVE EXAMPLE 2:

An urethane foam was prepared in the same way as in Example 1 except using as a polyol polyoxypropylene triol having an average molecular weight of 3,000 and obtained by adding propylene oxide to glycerol. Subsequently, commercially available 85% phosphoric acid was coated on the urethane foam at a ratio of 20 g/1 m$^2$. There resulted a soft polyurethane foam (II').

COMPARATIVE EXAMPLE 3:

2,250 parts of polyoxypropylene glycol having an average molecular weight of 1,500 and obtained by adding propylene oxide to propylene glycol, 500 parts of phthalic anhydride, 2.5 parts of triethylamine and 250 parts of propylene oxide were charged into a pressure reaction vessel and reacted at 80° to 120° C. After the reaction terminated, an unreacted propylene oxide and low-boiling compounds were removed under reduced pressure. 50 parts of the resulting polyester ether polyol having a hydroxyl value of 55 and an acid value of 0.20, 48 parts of polyoxypropylene triol having an average molecular weight of 3,000 and obtained by adding propylene oxide to glycerol, and 2 g of propoxylated phosphoric acid used in Comparative Example 1 were mixed, and the mixture was foamed as in Example 1 to afford a soft polyurethane foam (III').

Heat-fusing method

Each of the soft polyurethane foams obtained in (I) to (VIII) and (I') to (III') above was sliced to a thickness of 15 mm and cut to a size of 150 mm in length and 50 mm in width. The whole surface each of the sample foams was melted by means of a gas burner with a fixed flame and immediately heat-fused onto a given woven fabric under fixed pressure. After the resulting fabric was left to stand for 24 hours, a test piece, 120 mm×25 mm, was taken and measured for peel strength according to JIS L-1066-1963. The results are shown in Table 1.

Method of testing scorch resistance 70 parts of Silicone L-540 and 7 parts of stannous octoate were added to a solution containing 3,500 parts each of the polyols used in Examples 1 to 8 and Comparative Examples 1 to 3, 3.5 parts of triethylenediamine and 175 parts of water. TDI-80 (NCO index 120) was further added, and the mixture was vigorously stirred, followed by pouring the solution into a die 70 cm long, 70 cm wide and 50 cm high. There resulted a soft polyurethane foam. The following day, the central portion was sliced to a thickness of 7 cm, and a yellowness was measured by a color meter ("Color Meter Σ80"; a tradename for a device manufactured by Nippon Denshoku Kogyo K.K.). The results are shown in Table 1.

From Table 1, it has been ascertained that the foams of this invention are superior to the conventional foams in heat fusibility and scorch resistance.

TABLE 1

| | Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| | | | | | | Foam No. | | | | | |
| | (I) | (II) | (III) | (IV) | (V) | (VI) | (VII) | (VIII) | (I') | (II') | (III') |
| Foam density (g/cm$^3$) | 0.0207 | 0.0210 | 0.0209 | 0.0210 | 0.0207 | 0.0207 | 0.0210 | 0.0209 | 0.0208 | 0.0210 | 0.0210 |
| 25% Compression hardness (kg/314 cm$^2$) | 12.5 | 13.7 | 13.5 | 12.3 | 13.1 | 12.6 | 11.9 | 13.6 | 9.7 | 11.0 | 9.3 |
| Tensile strength (kg/cm$^2$) | 1.20 | 1.39 | 1.35 | 1.25 | 1.30 | 1.30 | 1.35 | 1.30 | 0.92 | 1.15 | 0.89 |
| Elongation (%) | 230 | 270 | 250 | 260 | 240 | 260 | 290 | 270 | 215 | 210 | 195 |
| Tear strength (kg/cm) | 0.96 | 1.30 | 1.27 | 1.05 | 1.15 | 1.13 | 1.32 | 1.21 | 0.52 | 0.67 | 0.55 |
| 50% Compression set (%) | 3.7 | 3.0 | 3.1 | 2.7 | 2.9 | 2.8 | 2.6 | 3.4 | 5.3 | 6.0 | 6.5 |
| Heat fusibility (g/inch) | | | | | | | | | | | |
| Fabric  Nylon | 400 | 520 | 470 | 450 | 500 | 510 | 480 | 530 | 210 | 230 | 270 |
| Polyester | 400 | 500 | 410 | 450 | 480 | 470 | 470 | 490 | 130 | 120 | 190 |
| PVC | 350 | 470 | 400 | 370 | 420 | 390 | 440 | 460 | 90 | 70 | 160 |
| Scorch resistance Yellowness | 0.10 | 0.12 | 0.09 | 0.13 | 0.15 | 0.16 | 0.08 | 0.10 | 3.8 | — | 5.3 |

Method of testing stability of polyols 30 g each of the starting polyols in Examples 1 to 8 and Comparative Examples 1 & 3 was charged into a 100 cc beaker and stored for 4 weeks under conditions such that a relative humidity was 100% and a temperature 50° C., and changes in appearance and acid value with time were measured. The results are shown in Table 2.

TABLE 2

|  |  | Example | | | | | | | | Comparative Example | |
|---|---|---|---|---|---|---|---|---|---|---|---|
|  |  | 1 | 2 | 3 | 4 | 5 | 6 | 7 | 8 | 1 | 3 |
| Appearance | Before test | Transparent | | | | | | | | Transparent | |
|  | After test | | | | | | | | | Transparent | Turbid |
| Acid value | Before test | 0.035 | 0.033 | 0.033 | 0.045 | 0.041 | 0.050 | 0.043 | 0.050 | 0.060 | 0.100 |
|  | After test | 0.037 | 0.033 | 0.038 | 0.046 | 0.045 | 0.050 | 0.045 | 0.055 | 0.815 | 2.310 |

From Table 2, it has been confirmed that the polyols of this invention are superior in stability to the conventional polyols.

EXAMPLE 9:

1,500 parts of polyoxypropylene diol having a molecular weight of 1,500 was reacted with 348 parts of a mixture of 2,4- and 2,6-tolylene diisocyanates (2,4/2,6 mixing ratio 80/20: hereinafter called "TDI-80") at 80° C. under an atmosphere of nitrogen to afford an urethane prepolymer having NCO groups at both terminals. Subsequently, the prepolymer was reacted with 212 parts of diethylene glycol under the same conditions to form a terminal hydroxyl group-containing urethane prepolymer (hydroxyl value 54.5).

40 parts of the terminal hydroxyl group-containing urethane prepolymer was mixed with 70 parts of polyoxypropylene triol having a molecular weight of 3,000. To the mixture were added a solution of 0.1 part of triethylenediamine in 4.0 parts of water, 1.0 part of Silicone L-540 (tradename for a product made by Nippon Unitika K.K.) and 0.25 part of stannous octoate. Further, 49.6 parts (NCO index 105) of TDI-80 was added, and the mixture was vigorously stirred and poured into a suitable die. There resulted a soft polyurethane foam (IX).

EXAMPLE 10:

134 parts of trimethylolpropane, 4,500 parts of polyoxypropylene diol having a molecular weight of 1,500 and 522 parts of TDI-80 were reacted at 80° C. under an atmosphere of nitrogen gas to provide a terminal hydroxyl group-containing urethane prepolymer (hydroxyl value 32.6).

Foaming was conducted as in Example 1 except using as a polyol a mixture of 35 parts of the terminal hydroxyl group-containing urethane prepolymer and 65 parts of polyoxypropylene triol having a molecular weight of 3,000. There resulted a soft polyurethane foam (X).

EXAMPLE 11:

A polyester polyol (hydroxyl value 53.0) was prepared from 374 parts of polyoxypropylene diol having a molecular weight of 600, 146 parts of adipic acid and 39 parts of ethylene glycol. 2,120 parts of the resulting polyester polyol was reacted with 348 parts of TDI-80 to form a terminal NCO group-containing prepolymer which was then reacted with 208 parts of neopentyl glycol. There was obtained a terminal hydroxyl group-containing urethane prepolymer (hydroxyl value 42.0).

Foaming was performed as in Example 1 except using as a polyol a mixture of 30 parts of the above terminal hydroxyl group-containing urethane prepolymer and 70 parts of polyoxypropylene triol having a molecular weight of 3,000. There was obtained a soft polyurethane foam (XI).

EXAMPLE 12:

1,300 parts of an aromatic ring-containing diol having a molecular weight of 1,300 and obtained by adding propylene oxide to bisphenol A was reacted with 348 parts of TDI-80 to form a terminal NCO group-containing urethane prepolymer. Said prepolymer was then reacted with 212 parts of diethylene glycol to afford a terminal hydroxyl group-containing urethane prepolymer.

Foaming was preformed as in Example 1 except using as a polyol a mixture of 40 parts of the terminal hydroxyl group-containing urethane prepolymer and 60 parts of polyoxypropylene tetrol having a molecular weight of 3,000. There resulted a soft polyurethane foam (XII).

EXAMPLE 13:

1,500 parts of a polyester ether (molecular weight about 1,500) obtained from an aromatic ring-containing diol (molecular weight 600) resulting from adding propylene oxide to bisphenol A and adipic acid was reacted with 348 parts of TDI-80 to form a terminal NCO group-containing urethane prepolymer. Said prepolymer was then reacted with 124 parts of ethylene glycol to afford a terminal hydroxyl group-containing urethane prepolymer (hydroxyl value 56.9).

Foaming was conducted as in Example 1 except using as a polyol a mixture of 30 parts of the terminal hydroxyl group-containing urethane prepolymer and 70 parts of polyoxypropylene triol having a molecular weight of 3,000. There was obtained a soft polyurethane foam (XIII).

EXAMPLE 14:

A polyester ether polyol containing about 3% of trimethylolpropane in a molecule and having a hydroxyl value of 53.5 and an acid value of 0.17 was obtained from an aromatic ring-containing polyether having a molecular weight of 800 and formed by adding propylene oxide to bisphenol A, trimethylolpropane and a sebacic acid/isophthalic acid (molar ratio 3/7) mixture. 1,050 parts of the polyester ether polyol was reacted with 174 parts of TDI-80 to afford a terminal NCO group-containing urethane prepolymer. Said prepolymer was then reacted with 106 parts of diethylene glycol to provide a terminal hydroxyl group-containing urethane prepolymer.

Foaming was conducted as in Example 1 except using as a polyol a mixture of 25 parts of the terminal hydroxyl group-containing urethane prepolymer and 75 parts of polyoxypropylene triol having a molecular weight of 3,000. There resulted a soft polyurethane foam (XIV).

EXAMPLE 15:

1,500 parts of polyoxytetramethylene glycol having a molecular weight of 1,500 was reacted with 348 parts of TDI-80 to obtain a terminal NCO group-containing urethane prepolymer, followed by reacting the prepolymer with 180 parts of 1,4-butanediol. There resulted a terminal hydroxyl group-containing urethane prepolymer.

Foaming was carried out as in Example 1 except using as a polyol a mixture of 50 parts of the terminal hydroxyl group-containing urethane prepolymer and 50 parts of polyoxypropylene triol having a molecular weight of 3,000. There was obtained a soft polyurethane foam (XV).

EXAMPLE 16:

1,500 parts of polyethylene.butylene adipate having a molecular weight of 1,500 was reacted with 348 parts of TDI-80 to afford a terminal NCO group-containing urethane prepolymer, followed by reacting the prepolymer with 212 parts of diethylene glycol. There was obtained a terminal hydroxyl group-containing urethane prepolymer.

Foaming was carried out as in Example 1 except using as a polyol a mixture of 30 parts of the terminal hydroxyl group-containing urethane prepolymer and 70 parts of polyoxypropylene triol having a molecular weight of 3,000. A soft urethane foam (XVI) was thus provided.

Test for heat fusibility and scorch resistance

The soft urethane foams (IV) to (XVI) obtained in Examples 9 to 16 were tested as in Example 1. The results are shown in Table 3.

From Table 3, it has been confirmed that the foams of this invention are superior to the conventional ones in heat fusibility and scorch resistance.

TABLE 3

| | | Example | | | | | | | |
|---|---|---|---|---|---|---|---|---|---|
| | | 9 | 10 | 11 | 12 | 13 | 14 | 15 | 16 |
| | | Foam No. | | | | | | | |
| | | (I) | (II) | (III) | (IV) | (V) | (VI) | (VII) | (VIII) |
| Foam density (g/cm³) | | 0.0208 | 0.0208 | 0.0209 | 0.0207 | 0.0210 | 0.0209 | 0.0209 | 0.0208 |
| 25% Compression hardness (kg/314 cm²) | | 10.3 | 11.1 | 10.7 | 11.8 | 12.8 | 13.1 | 10.1 | 12.0 |
| Tensile strength (kg/cm²) | | 0.98 | 1.17 | 1.05 | 1.23 | 1.32 | 1.35 | 1.20 | 1.19 |
| Elongation (%) | | 255 | 240 | 270 | 230 | 240 | 260 | 280 | 250 |
| Tear strength (kg/cm) | | 0.91 | 0.95 | 1.20 | 0.98 | 1.15 | 1.16 | 1.15 | 1.00 |
| 50% compression set (%) | | 3.1 | 2.8 | 3.3 | 3.2 | 2.9 | 2.7 | 2.5 | 3.5 |
| Heat fusibility (g/inch) | | | | | | | | | |
| Fabric | Nylon | 370 | 350 | 400 | 360 | 430 | 430 | 350 | 450 |
| | Polyester | 350 | 300 | 370 | 330 | 400 | 410 | 310 | 400 |
| | PVC | 310 | 300 | 330 | 340 | 350 | 390 | 300 | 400 |
| Scorch resistance (Yellowness) | | 0.15 | 0.13 | 0.10 | 0.10 | 0.16 | 0.17 | 0.10 | 0.20 |

Methods of measuring properties of foams:
Hardness and compression set of foams ... JIS K-6401
Tensile strength and elongation ... ASTM D-1564
Tear strength ... JIS K-6301

Test for stability of polyols 30 g each of the starting polyols in Examples 9 to 16 was charged in a 100 cc beaker and stored for 4 weeks at a temperature of 50° C. and a relative humidity of 100%, and measured for changes in appearance and acid value with time. The results are shown in Table 4.

TABLE 4

| | | Example | | | | | | | |
|---|---|---|---|---|---|---|---|---|---|
| | | 9 | 10 | 11 | 12 | 13 | 14 | 15 | 16 |
| Appearance | Before test | Transparent | | | | | | | |
| | After test | | | | | | | | |
| Acid Value | Before test | 0.030 | 0.027 | 0.050 | 0.032 | 0.046 | 0.041 | 0.029 | 0.043 |
| | After test | 0.030 | 0.028 | 0.052 | 0.032 | 0.049 | 0.041 | 0.029 | 0.047 |

From Table 4, it has been confirmed that the polyols of this invention are superior in stability to the conventional ones.

EXAMPLE 17:

40 parts of a polyester ether diol (hydroxyl value 57.0, acid value 0.23, average molecular weight 1,968) obtained from an aromatic ring-containing polyether having a molecular weight of about 600 and resulting from adding propylene oxide to bisphenol A and azelaic acid/isophthalic acid (molar ratio 1/1) mixture was mixed with 60 parts of polyoxypropylene triol having an average molecular weight of 3,000 and formed by adding propylene oxide to glycerol. To the mixture were added a solution of 0.1 part of triethylenediamine in 4.0 parts of water, 1.0 part of Silicon L-540 (tradename for a product made by Nippon Unitika K. K.), 0.2 part of stannous octoate and 5 parts of freon. 50 parts of a mixture of 2,4-and 2,6-tolylene diisocyanates (mixing ratio 80/20, NCO index 105; hereinafter called "TDI-80") was further added, and the mixture was vigorously stirred, followed by pouring it into a suitable die. There resulted a soft polyurethane foam (XVII).

EXAMPLE 18:

A soft polyurethane foam (XVIII) was produced by foaming as in Example 1 a mixture comprising 50 parts of a polyester ether diol (hydroxyl value 59.3, acid value 0.15, average molecular weight 1,887) obtained from a sebacic acid/isophthalic acid (molar ratio 2/8) mixture instead of the azelaic acid/isophthalic acid mixture and 50 parts of polyoxypropylene triol (average molecular weight 3,000) resulting from adding propylene oxide to glycerol.

EXAMPLE 19:

A soft polyurethane foam (XIX) was produced by foaming as in Example 1 a mixture comprising 45 parts of a polyester ether polyol (hydroxyl value 61.0, acid value 0.17) containing about 3% of trimethylolpropane in a molecule and obtained from an aromatic ring-containing polyether (molecular weight about 600) formed by adding propylene oxide to bisphenol A and a sebacic acid/isophthalic acid (molar ratio 3/7) mixture and 55 parts of polyoxypropylene triol (average molecular weight 3,000) obtained by adding propylene oxide to glycerol.

EXAMPLE 20:

A soft polyurethane foam (XX) was produced by foaming as in Example 1 a mixture comprising 40 parts of a polyester ether polyol (hydroxyl value 45.0, acid value 0.30, average molecular weight 2,500) obtained from an aromatic ring-containing polyether (molecular weight about 350) formed by adding propylene oxide to bisphenol A and a decamethylene dicarboxylic acid-/isophthalic acid (molar ratio 1/1) mixture and 60 parts of polyoxypropylene triol (average molecular weight 3,000) formed by adding propylene oxide to glycerol.

EXAMPLE 21:

A soft polyurethane foam (XXI) was produced by foaming as in Example 1 a mixture comprising an aromatic ring-containing polyether (molecular weight about 1,500) formed by adding propylene oxide to bisphenol A and a sebasic acid/terephthalic acid (molar ratio 6/4) mixture and 70 parts of polyoxypropylene triol (a molecular weight 3,000).

Tests for heat fusibility and scorch resistance

The soft polyurethane foams (XVII) to (XXI) obtained in Examples 17 to 21 were tested as in Example 1. The results are shown in Table 5.

TABLE 5

|  | Example | | | | |
|---|---|---|---|---|---|
|  | 17 | 18 | 19 | 20 | 21 |
|  | Foam No. | | | | |
|  | (XVII) | (XVIII) | (XIX) | (XX) | (XXI) |
| Foam density (g/cm³) | 0.0207 | 0.0208 | 0.0209 | 0.0209 | 0.0209 |
| 25% Compression hardness (kg/314 cm²) | 12.6 | 13.0 | 13.5 | 13.7 | 12.8 |

TABLE 5-continued

|  | Example | | | | |
|---|---|---|---|---|---|
|  | 17 | 18 | 19 | 20 | 21 |
|  | Foam No. | | | | |
|  | (XVII) | (XVIII) | (XIX) | (XX) | (XXI) |
| Tensile strength (kg/cm²) | 1.21 | 1.20 | 1.18 | 1.22 | 1.19 |
| Elongation (%) | 245 | 255 | 230 | 250 | 270 |
| Tear strength (kg/cm) | 0.83 | 0.89 | 0.74 | 0.85 | 0.80 |
| 50% Compression set (%) | 3.5 | 3.1 | 2.7 | 3.7 | 3.8 |
| Heat fusibility (g/inch) | | | | | |
| Fabric Nylon | 390 | 400 | 380 | 400 | 370 |
| Polyester | 360 | 370 | 350 | 360 | 350 |
| PVC | 300 | 320 | 310 | 310 | 300 |
| Scorch resistance (Yellowness) | 0.17 | 0.12 | 0.10 | 0.20 | 0.25 |

From Table 5, it has been ascertained that the soft polyurethane foams of this invention are excellent in heat fusibility, scorch resistance and mechanical properties.

Methods of measuring properties of foams:

Hardness and compression set of foams ... JIS K-6401

Tensile strength and elongation ... ASTM D-1564

Tear strength ... JIS K-6301

Test for stability of polyols 30 g each of the starting polyols in Examples 17 to 21 was charged into a 100 cc beaker and stored for 4 weeks at a temperature of 50° C. and a relative humidity of 100. Changes in appearance and acid value with time were then measured. The results are shown in Table 6.

From Table 6, it has been confirmed that the polyols of this invention have excellent stability.

TABLE 6

|  |  | Example | | | | |
|---|---|---|---|---|---|---|
|  |  | 17 | 18 | 19 | 20 | 21 |
| Appearance | Before test | Transparent | | | | |
|  | After test | | | | | |
| Acid value | Before test | 0.080 | 0.075 | 0.077 | 0.125 | 0.130 |
|  | After test | 0.083 | 0.075 | 0.079 | 0.129 | 0.130 |

What we claim is:

1. A heat-fusible soft polyurethane foam produced from at least one polyhydroxy compound, a polyisocyanate, a catalyst, a foam stabilizer and a blowing agent, the improvement wherein the said at least one polyhydroxy compound comprises a mixture of (1) and (2):
   (1) a polyol containing a terminal hydroxyl group and an urethane bond obtained by the reaction of at least one polyol selected from the group consisting of components (A) to (H) with a polyisocyanate, and
   (2) at least one polyol selected from the group consisting of components (D), (E) and (F);
wherein components (A) to (H) are defined as follows:
   (A) a low-molecular-weight polyhydroxy compound containing 2 to 4 functional groups and having a molecular weight of 60 to 200,
   (B) a non-aromatic polyoxyalkylene polyol having a molecular weight of 300 to 5,000 and obtained by adding an alkylene oxide to a low-molecular-weight polyhydroxy compound containing 2 to 4 functional groups and having a molecular weight of 60 to 300, (C) an aromatic ring-containing diol having a molecular weight of 230 to 5,000 and obtained by adding an alkylene oxide to an aromatic dihydroxy compound represented by the formula

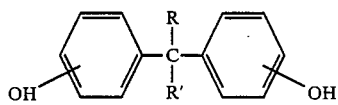

wherein R and R' each denote hydrogen or an alkyl group, or

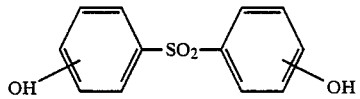

(D) a polyester ether polyol having a molecular weight of 500 to 6,000 and comprising a polyoxyalkylene glycol, said glycol having a molecular weight of 300 to 5,000 and obtained by adding an alkylene oxide other than ethylene oxide to a low-molecular-weight polyhydroxy compound containing 2 to 4 functional groups and having a molecular weight of 60 to 300, and optionally a low-molecular-weight polyhydroxy compound containing 2 to 4 functional groups and having a molecular weight of 60 to 300 as an alcohol component, and at least one compound selected from aliphatic dicarboxylic acids, aromatic dicarboxylic acids, and their anhydrides and derivatives as an acid component, (E) a polyester ether polyol having a molecular weight of 500 to 6,000 and comprising an aromatic ring-containing diol having a molecular weight of 230 to 5,000 and obtained by adding an alkylene oxide to an aromatic dihydroxy compound represented by the formula

wherein R and R' each denote hydrogen or an alkyl group, or

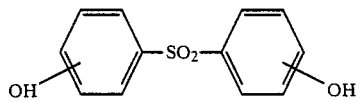

and optionally a low-molecular-weight polyhydroxy compound containing 2 to 4 functional groups and having a molecular weight of 60 to 300 as an alcohol component, and at least one compound selected from aliphatic dicarboxylic acids having 3 to 6 carbon atoms, aromatic dicarboxylic acids, and their anhydrides and derivatives as an acid component, (F) a polyester ether polyol having a molecular weight of 500 to 6,000 and comprising an aromatic ring-containing diol having a molecular weight of 230 to 5,000 and obtained by adding an alkylene oxide to an aromatic dihydroxy compound represented by the formula

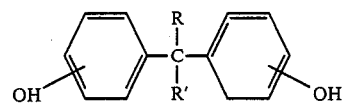

wherein R and R' each denote hydrogen or an alkyl group, or

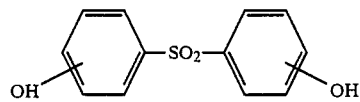

and optionally a low-molecular-weight polyhydroxy compound containing 2 to 4 functional groups and having a molecular weight of 60 to 300 as an alcohol component, and a mixture of aromatic dicarboxylic acids and long-chain aliphatic dicarboxylic acids having 7 to 14 carbon atoms, or their anhydrides or derivatives as an acid component, (G) polyoxytetramethylene glycol having a molecular weight of 500 to 5,000, and (H) (i) an acid-alcohol-condensation polyester polyol obtained from the low-molecular-weight polyhydroxy compound (A) containing 2 to 4 functional groups and having the molecular weight of 60 to 200 and at least one compound selected from the group consisting of aliphatic dicarboxylic acids, aromatic dicarboxylic acids and their anhydrides and derivatives or (ii) a polylactone polyester polyol formed by polymerizing ε-caprolactone, or a mixture of (i) and (ii).

2. A heat-fusible soft polyurethane foam produced from a mixture of polyhydroxy compounds, a polyisocyanate, a catalyst, a foam stabilizer and a blowing agent, the improvement wherein the mixture of polyhydroxy compounds comprises a polyol containing a terminal hydroxyl group and an urethane bond obtained by the reaction of a polyol of component (A) and at least one polyol selected from the group consisting of components (B) to (H) with a polyisocyanate, wherein components (A) to (H) are defined as follows:

(A) a low-molecular-weight polyhydroxy compound containing 2 to 4 functional groups and having a molecular weight of 60 to 200, (B) a non-aromatic polyoxyalkylene polyol having a molecular weight of 300 to 5,000 and obtained by adding an alkylene oxide to the low-molecular-weight polyhydroxy compound containing 2 to 4 functional groups and having a molecular weight of 60 to 300, (C) an aromatic ring-containing diol having a molecular weight of 230 to 5,000 and obtained by adding an alkylene oxide to an aromatic dihydroxy compound represented by the formula

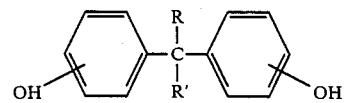

wherein R and R' each denote hydrogen or an alkyl group, or

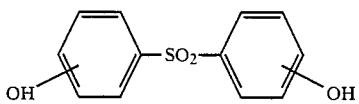

(D) a polyester ether polyol having a molecular weight of 500 to 6,000 and comprising a polyoxyalkylene glycol, said glycol having a molecular weight of 300 to 5,000 and obtained by adding an alkylene oxide other than ethylene oxide to a low-molecular-weight polyhydroxy compound containing 2 to 4 functional groups and having a molecular weight of 60 to 300, and optionally a low-molecular-weight polyhydroxy compound containing 2 to 4 functional groups and having a molecular weight of 60 to 300 as an alcohol component, and at least one compound selected from aliphatic dicarboxylic acids, aromatic dicarboxylic acids, and their anhydrides and derivatives as an acid component, (E) a polyester ether polyol having a molecular weight of 500 to 6,000 and comprising an aromatic ring-containing diol having a molecular weight of 230 to 5,000 and obtained by adding an alkylene oxide to an aromatic dihydroxy compound represented by the formula

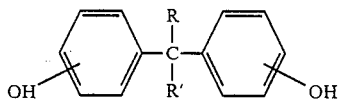

wherein R and R' each denote hydrogen or an alkyl group, or

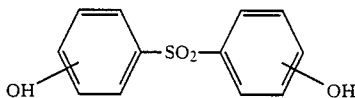

and optionally a low-molecular-weight polyhydroxy compound containing 2 to 4 functional groups and having a molecular weight of 60 to 300 as an alcohol component, and at least one compound selected from aliphatic dicarboxylic acids having 3 to 6 carbon atoms, aromatic dicarboxylic acids, and their anhydrides and derivatives as an acid component, (F) a polyester ether polyol having a molecular weight of 500 to 6,000 and comprising an aromatic ring-containing diol having a molecular weight of 230 to 5,000 and obtained by adding an alkylene oxide to an aromatic dihydroxy compound represented by the formula

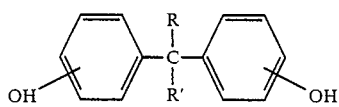

wherein R and R' each denote hydrogen or an alkyl group, or

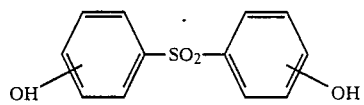

and optionally a low-molecular-weight polyhydroxy compound containing 2 to 4 functional groups and having a molecular weight of 60 to 300 as an alcohol component, and a mixture of aromatic dicarboxylic acids and long-chain aliphatic dicarboxylic acids having 7 to 14 carbon atoms, or their anhydrides or derivatives as an acid component, (G) polyoxytetramethylene glycol having a molecular weight of 500 to 5,000, and (H) (i) an acid-alcohol-condensation polyester polyol obtained from the low-molecular-weight polyhydroxy compound (A) containing 2 to 4 functional groups and having the molecular weight of 60 to 200 and at least one compound selected from the group consisting of aliphatic dicarboxylic acids, aromatic dicarboxylic acids and their anhydrides and derivatives or (ii) a polylactone polyester polyol formed by polymerizing ε-caprolactone, or a mixture of (i) and (ii).

3. A heat-fusible soft polyurethane foam produced from at least one polyhydroxy compound, a polyisocyanate, a catalyst, a foam stabilizer and a blowing agent, the improvement wherein the polyhydroxy compound is at least one polyol selected from the group consisting of components (D), (E) and (F) wherein components (D)-(F) are defined as follows:

(D) a polyester ether polyol having a molecular weight of 500 to 6,000 and comprising a polyoxyalkylene glycol said glycol having a molecular weight of 300 to 5,000 and obtained by adding an alkylene oxide other than ethylene oxide to a low-molecular-weight polyhydroxy compound containing 2 to 4 functional groups and having a molecular weight of 60 to 300, and optionally a low-molecular-weight polyhydroxy compound containing 2 to 4 functional groups and having a molecular weight of 60 to 300 as an alcohol component, and at least one compound selected from aliphatic dicarboxylic acids, aromatic dicarboxylic acids, and their anhydrides and derivatives as an acid component, (E) a polyester ether polyol having a molecular weight of 500 to 6,000 and comprising an aromatic ring-containing diol having a molecular weight of 230 to 5,000 and obtained by adding an alkylene oxide to an aromatic dihydroxy compound represented by the formula

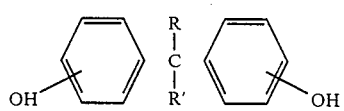

wherein R and R' each denote hydrogen or an alkyl group, or

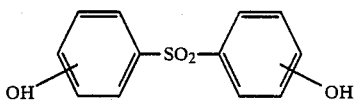

and optionally a low-molecular-weight polyhydroxy compound containing 2 to 4 functional groups and having a molecular weight of 60 to 300 as an alcohol component, and at least one compound selected from aliphatic dicarboxylic acids having 3 to 6 carbon atoms, aromatic dicarboxylic acids, and their anhydrides and derivatives as an acid component, (F) a polyester ether polyol having a molecular weight of 500 to 6,000 and comprising an aromatic ring-containing diol having a molecular weight of 230 to 5,000 and obtained by adding an alkylene oxide to an aromatic dihydroxy compound represented by the formula

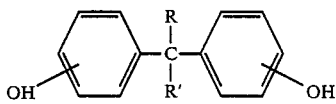

wherein R and R' each denote hydrogen or an alkyl group, or

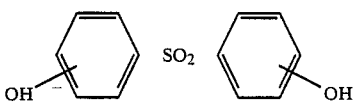

and optionally a low-molecular-weight polyhydroxy compound containing 2 to 4 functional groups and having a molecular weight of 60 to 300 as an alcohol component, and a mixture of aromatic dicarboxylic acids and long-chain aliphatic dicarboxylic acids having 7 to 14 carbon atoms, or their anhydrides or derivatives as an acid component.

4. The heat-fusible soft polyurethane foam of claim 1, 2, or 3 wherein component (D) is used and is obtained by using o-phthalic acid, isophthalic acid or terephthalic acid as an acid component.

5. The heat-fusible soft polyurethane foam of claim 1 or 2 wherein component (H) is used and is obtained by using a low-molecular-weight polyhydroxy compound containing 2 to 4 functional groups and having a molecular weight of 60 to 300.

6. The heat-fusible soft polyurethane foam of claim 1, or 2 wherein the polyol containing a terminal hydroxyl group and a urethane bond has a hydroxyl value of 5 to 150.

7. The heat-fusible soft polyurethane foam of claim 1 or 3 wherein said at least one polyol selected from the group consisting of components (D), (E) and (F) has a hydroxyl value of 15 to 250.

8. The heat-fusible soft polyurethane of claim 2 wherein the low-molecular-weight polyhydroxy compound (A) is selected from the group consisting of ethylene glycol, 1,2-propylene glycol, 1,3-propylene glycol, 1,3-butylene glycol, 1,4-butylene glycol, 1,6-methylene glycol, bishydroxyethoxybenzene glycol, bishydroxyethoxy-p-xylene glycol, neopentyl, glycerol, trimethylolpropane, hexanetriol, triethanolamine and pentaerythritol.

9. The heat-fusible soft polyurethane foam of claim 2 wherein the mixture of polyhydroxy compounds comprises a mixture of the polyol component (A) and at least one other of said polyol components (B), (D), (E) and (F).

10. The heat-fusible soft polyurethane foam of any one of claims 1, 2, or 3 wherein the polyisocyanate is selected from the group consisting of 2,4-tolylene diisocyanate, 2,6-tolylene diisocyanate, mixtures of 2,4-tolylene diisocyanate and 2,6-tolylene diisocyanate, and m-phenylene diisocyanate, p-phenylene diisocyanate, p-xylene diisocyanate, ethylene diisocyanate, tetramethylene-1,4-diisocyanate, hexamethylene-1,6-diisocyanate, diphenylmethane-4,4'-diisocyanate, 3,3'-dimethyldiphenylmethane-4,4'-diisocyanate, 3,3'-dimethyl-4,4'-biphenylene diisocyanate, 3,3'-dichloro-4,4'-biphenylene diisocyanate, 4,4'-biphenylene diisocyanate, and 1,5-naphthalene diisocyanate.

11. The heat-fusible soft polyurethane foam of claim 1 wherein the amount of the polyisocyanate compound is such that the equivalent ratio NCO/OH of the isocyanate groups (NCO) to the hydroxyl groups (OH) of said at least one polyhydroxy compound is from 1 to 1.2.

12. The heat-fusible soft polyurethane foam of claim 2 wherein the amount of the polyisocyanate compound is such that the equivalent ratio NCO/OH of the isocyanate groups (NCO) of the polyisocyanate to the hydroxyl groups (OH) of the mixture of polyhydroxy compounds is from 1 to 1.2.

13. The heat-fusible soft polyurethane foam of claim 3 wherein the amount of the polyisocyanate is such that the equivalent ratio NCO/OH of the isocyanate groups (NCO) to the hydroxyl groups (OH) of said at least one polyol is from 1 to 1.2.

* * * * *

UNITED STATES PATENT AND TRADEMARK OFFICE
CERTIFICATE OF CORRECTION

PATENT NO. : 4,904,706
DATED : February 27, 1990
INVENTOR(S) : Kazuya Uenishi and Yasuji Tsunekawa It is certified that error appears in the above-identified patent and that said Letters Patent is hereby corrected as shown below:

Column 20, line 60-65:
Claim 3, line 30, delete the formula and insert therefor:

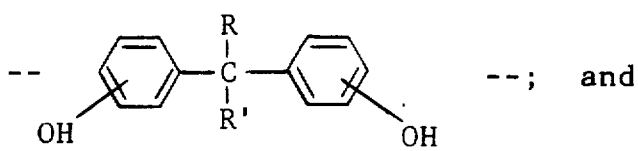 ; and

Column 21, lines 30-35:
Claim 3, line 51, delete the formula and insert therefor:

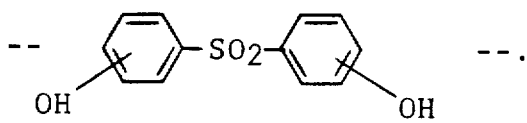 .

Signed and Sealed this

Fourteenth Day of May, 1991

Attest:

HARRY F. MANBECK, JR.

Attesting Officer

Commissioner of Patents and Trademarks